United States Patent
Shouji

(10) Patent No.: US 8,829,832 B2
(45) Date of Patent: Sep. 9, 2014

(54) ELECTRIC MOTOR CONTROLLER AND ELECTRIC MOTOR CONTROL SYSTEM

(75) Inventor: Mitsuhiro Shouji, Yamato (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 162 days.

(21) Appl. No.: 13/697,973

(22) PCT Filed: May 12, 2011

(86) PCT No.: PCT/JP2011/002650
§ 371 (c)(1),
(2), (4) Date: Nov. 14, 2012

(87) PCT Pub. No.: WO2011/151977
PCT Pub. Date: Dec. 8, 2011

(65) Prior Publication Data
US 2013/0063058 A1  Mar. 14, 2013

(30) Foreign Application Priority Data

Jun. 3, 2010  (JP) ................................. 2010-127385

(51) Int. Cl.
*H02P 21/14* (2006.01)
*H02P 21/06* (2006.01)
*H02P 27/08* (2006.01)
*H02P 21/00* (2006.01)
*H02M 7/5387* (2007.01)

(52) U.S. Cl.
CPC *H02M 7/53875* (2013.01); *H02M 2007/53876* (2013.01); *H02P 21/06* (2013.01); *H02P 27/085* (2013.01); *H02P 21/0035* (2013.01)

USPC ............. 318/400.02; 318/400.05; 318/400.13

(58) Field of Classification Search
CPC ...................................................... H02P 21/145
USPC .................. 318/700, 400.01, 400.02, 400.04, 318/400.05, 400.07, 400.13
See application file for complete search history.

(56) References Cited

U.S. PATENT DOCUMENTS

| | | | |
|---|---|---|---|
| 5,594,670 A * | 1/1997 | Yamamoto | 702/64 |
| 5,640,073 A * | 6/1997 | Ikeda et al. | 318/400.03 |
| 6,593,719 B2 | 7/2003 | Satta et al. | |
| 8,076,890 B2 * | 12/2011 | Shoda et al. | 318/599 |
| 2002/0097992 A1 | 7/2002 | Satta et al. | |
| 2009/0237014 A1* | 9/2009 | Yamada | 318/400.02 |

FOREIGN PATENT DOCUMENTS

| | | |
|---|---|---|
| JP | 2002-199767 A | 7/2002 |
| JP | 2006-014406 A | 1/2006 |
| JP | 3812299 B2 | 6/2006 |
| JP | 2008-301656 A | 12/2008 |

\* cited by examiner

*Primary Examiner* — Bentsu Ro
(74) *Attorney, Agent, or Firm* — Foley & Lardner LLP

(57) ABSTRACT

A controller 40 performs a control operation in a cycle based on a carrier frequency fc of a carrier, specifically, at timings corresponding to the peaks and troughs of the carrier signal. Moreover, in the case where the carrier frequency fc is switched, a disturbance estimation part forming the controller 40 updates control constants that are used for disturbance estimation and are dependent on the control operation cycle, in a control operation performed one cycle after a control operation immediately after the switching of the carrier frequency fc.

13 Claims, 11 Drawing Sheets

ELECTRIC MOTOR CONTROLLER AND ELECTRIC MOTOR CONTROL SYSTEM

TECHNICAL FIELD

The present invention relates to an electric motor controller and electric motor control system.

BACKGROUND ART

Heretofore, electric motor controllers and electric motor control systems to control electric motors have been known. By using a method such, for example, as PWM wave voltage driving, this kind controller controls an electric motor through power conversion means for converting an inputted DC power into an AC power and outputting the AC power. For example, PTL 1 discloses a control technique in which, when an electric motor revolves at low rate with a large torque, the carrier frequency of a carrier signal is switched to a low frequency to prevent the breaking of switching means of the power conversion means attributable to heat. By switching the carrier frequency, it is possible to prevent a current from concentrating in a particular phase, and thereby to suppress increases in the heat and the damage on the switching means.

CITATION LIST

Patent Literature

PTL 1: Japanese Patent No. 3812299

SUMMARY OF INVENTION

Technical Problem

The controllers perform a control operation through interruption at timings in synchronization with a carrier signal, for example. Hence, when the carrier frequency is switched, the control operation cycle is switched at the same time. Meanwhile, a technique to control an electric motor through feedback control additionally using an estimated disturbance component has been known. According to this technique, the disturbance component is estimated using control constants dependent of the control operation cycle. In this case, since the control constants are changed at the same time as the switching of the carrier frequency, the disturbance component may be misestimated. This in turn may lead to a situation in which the electric motor becomes poor in the current response characteristics to provide a user with a strange feeling at the time of switching the carrier frequency.

The present invention has been made in view of such circumstances, and an objective thereof is to prevent misestimation of disturbance component at the time of switching the carrier frequency to thereby suppress deterioration in the current response characteristics.

Solution to Problem

In order to solve the above problem, in the present invention, a control unit includes: a current control part configured to calculate a voltage command value of a voltage to be applied to an electric motor; a drive signal generation part configured to generate a drive signal for driving a power conversion unit by comparing the voltage command value with a carrier signal; and a carrier frequency command part configured to instruct switching of the carrier frequency of the carrier signal. The control unit performs a control operation in a cycle based on the carrier frequency of the carrier signal. Here, the current control part includes: a feedback control part configured to calculate the voltage command value through feedback control using a current detection value; and a disturbance estimation part configured to add an estimated disturbance component to the voltage command value. In a case where the carrier frequency is switched, this disturbance estimation part updates a control constant that is used for the disturbance estimation and is dependent on a control operation cycle, in a control operation performed in a cycle subsequent to a control operation immediately after the switching of the carrier frequency.

Advantageous Effect of Invention

According to the present invention, the control constant that is used for the disturbance estimation and is dependent on the control operation cycle is updated in the control operation performed in a cycle subsequent to the control operation immediately after the switching of the carrier frequency. By this, it is possible to avoid such a situation that the control constant dependent on the control operation cycle is changed at the same time as the switching of the carrier frequency. Accordingly, a disturbance component can be estimated by using an appropriate control constant, and thus misestimation of the disturbance component can be prevented. Consequently, deterioration in the current response characteristics can be suppressed.

DESCRIPTION OF EMBODIMENTS

First Embodiment

Figure 1:
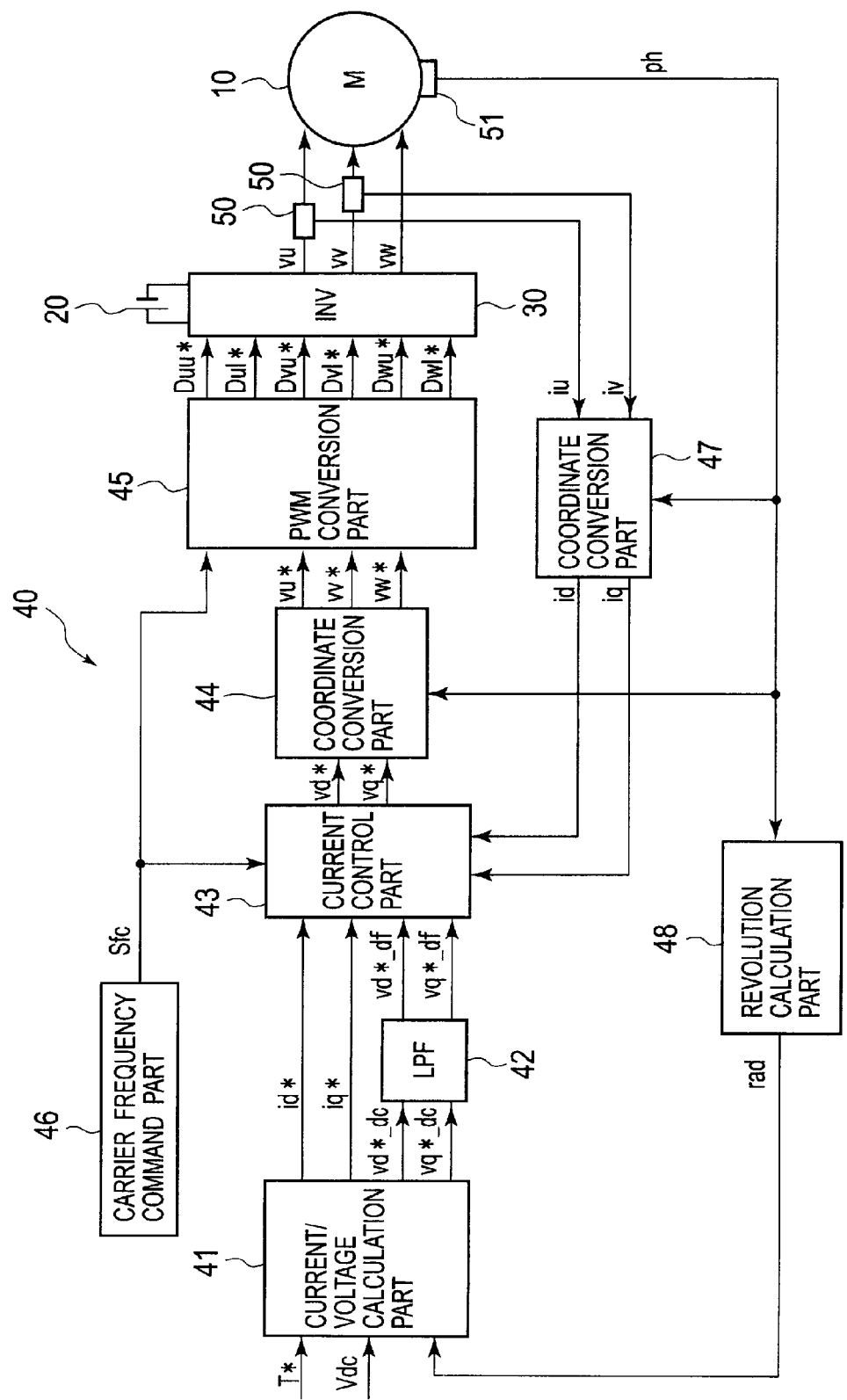
FIG. 1 is an explanatory diagram schematically showing the overall configuration of an electric motor control system according to a first embodiment.

FIG. 1 is an explanatory diagram schematically showing the overall configuration of an electric motor control system according to a first embodiment of the present invention. The electric motor control system according to this embodiment is applied to an electric vehicle and controls a drive motor (electric motor) thereof, for example. This electric motor control system is mainly formed of a motor 10, an inverter 30 serving as a power conversion unit or power conversion means, and a controller 40 (an electric motor controller).

The motor 10 is, for example, a multiphase AC synchronous motor having multiple phase windings (in this embodiment, three phase windings of a U-phase winding, a V-phase winding, and a W-phase winding) that are star-connected to each other with a neutral point as the center. This motor 10 is driven by the interaction between a magnetic field generated upon supply of three-phase AC powers from the inverter 30 to the respective phase windings and a magnetic field created by a permanent magnet of a rotor.

The inverter 30 is connected to a power supply 20, and generates three-phase AC currents from a DC power of the power supply 20 when unillustrated switches (a switching unit, switching means) are in a conducting state. Here, the power supply 20 is a DC power supply, and a battery such for example as a nickel metal hydride battery or a lithium ion battery can be used as the power supply 20.

Unilateral switches (switches capable of controlling conduction in one direction; not illustrated) corresponding to upper arms are connected between cathode buses connected to the cathode of the battery 20 and output terminals corresponding to the three phases, respectively. Moreover, unilateral switches (not illustrated) corresponding to lower arms are connected between anode buses connected to the anode of the battery 20 and output terminals corresponding to the three phases, respectively. Each switch is a semiconductor switch mainly formed of a transistor such for example as IGBT. A free wheel diode is connected to the transistor in anti-parallel.

The switching (switching operation) of the ON/OFF states or conducting states of the switches corresponding to the three-phase upper and lower arms are controlled by respective gate drive signals Duu* to Dwl* outputted from the controller 40. Each switch is brought into a conducting state when turned on by the corresponding one of the gate drive signals Duu* to Dwl*, and is brought into a non-conducting state (blocking state) when turned off by that gate drive signal.

The controller 40 includes a control unit that controls the inverter 30 to control the output torque of the motor 10. To be specific, the controller 40 generates the gate drive signals Duu* to Dwl* for the respective switches provided to the inverter 30 and controls the conducting states of the switches by these gate drive signals Duu* to Dwl*. Thus, the controller 40 controls, through the inverter 30, voltages vu to vw to be applied to the respective phases of the motor 10.

The controller 40 receives sensor signals detected by various sensors 50 and 51. For example, current sensors (a current detection unit, current detection means) 50 detect a U-phase current iu and a V-phase current iv in the motor 10, respectively. Here, because there exists a relationship that the sum of all the three-phase currents is equal to zero, the controller 40 can detect a W-phase current iw on the basis of the detection results of the U-phase and V-phase currents iu and iv. Meanwhile, a position sensor (e.g., resolver) 51 is attached to the motor 10 and detects the electrical rotational phase (electrical angle) ph of the motor 10.

The control unit (control means), when viewed in terms of its functions, includes a current/voltage calculation part 41, a low pass filter process part (LPF) 42, a current control part 43, a first coordinate conversion part 44, a PWM conversion part 45, a carrier frequency command part 46, a second coordinate conversion part 47, and a revolution calculation part 48.

The current/voltage calculation part 41 calculates d- and q-axis current command values id* and iq* and d- and q-axis interference voltage command values vd*_dc and vq*_dc on the basis of a torque command value T* of the motor 10, a power supply voltage Vdc, and a motor revolution rad. The d- and q-axis current command values id* and iq* calculated by the current/voltage calculation part 41 are current command values of the motor 10 corresponding to the d axis and the q axis, respectively. Moreover, the d- and q-axis interference voltage command values vd*_dc and vq*_dc are command values to perform decoupling control for feedforward compensation of induced voltages.

Here, the torque command value T* is inputted to the controller 40 (current/voltage calculation part 41) from an external device such as a vehicle controller. Also, the power supply voltage Vdc is the voltage of the power supply 20 inputted to the inverter 30. The motor revolution rad is the revolution (rotational speed) of the motor 10 and is calculated through differentiation performed by the revolution calculation part 48 on the basis of the electrical angle ph outputted from the position sensor 51.

The relationships of the torque command value T*, the power supply voltage Vdc, and the motor revolution rad with the d- and q-axis current command values id*, iq* and the d- and q-axis interference voltage command values vd*_dc, vq*_dc are acquired in advance through tests and simulations with the characteristics of the motor 10 and the like taken into consideration. The current/voltage calculation part 41 holds a map that defines the relationships. The current/voltage calculation part 41 calculates the d- and q-axis current command values id* and iq* and the d- and q-axis interference voltage command values vd*_dc and vq*_dc through map calculation. The calculated d- and q-axis current command values id* and iq* are outputted to the current control part 43. On the other hand, the calculated d- and q-axis interference voltage command values vd*_dc and vq*_dc are outputted to the low pass filter process part 42.

The low pass filter process part 42 performs a low pass filter process on the d- and q-axis interference voltage command values vd*_dc and vq*_dc and outputs the filtered d- and q-axis interference voltage command values vd*_df and vq*_df to the current control part 43.

The current control part (current control means) 43 calculates d- and q-axis voltage command values vd* and vq* on the basis of the d- and q-axis current command values id* and iq*, the d- and q-axis interference voltage command values vd*_df and vq*_df, d- and q-axis current detection values id and iq, and a carrier frequency command value Sfc. The d- and q-axis voltage command values vd* and vq* calculated in the current control part 43 are voltage command values of the motor 10 corresponding to the d axis and the q axis, respectively.

Here, the d- and q-axis current detection values id and iq are actual current values corresponding to the d axis and the q axis, respectively, and are calculated by the second coordinate conversion part 47 on the basis of the currents iu, iv, and iw of the respective phases that are obtained from the detection results of the current sensors 50. Specifically, the second coordinate conversion part 47 calculates the d- and q-axis current detection values id and iq on the basis of Math. 1.

$$\begin{bmatrix} id \\ iq \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} iu \\ iv \\ iw \end{bmatrix} \quad [\text{Math.1}]$$

The d- and q-axis voltage command values vd* and vq* thus calculated are outputted to the first coordinate conversion part 44. One of the characteristic features of this embodiment is the calculation method of the current control part 43, and details thereof will be described later.

The first coordinate conversion part 44 calculates U-, V-, and W-phase voltage command values vu* to vw* from the d- and q-axis voltage command values vd* and vq*. Specifically, the first coordinate conversion part 44 calculates the voltage command values vu* to vw* of the respective phases on the basis of Math. 2.

$$\begin{bmatrix} vu* \\ vv* \\ vw* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} vd* \\ vq* \end{bmatrix} \quad [\text{Math.2}]$$

With the assumption that a control method such as PWM wave voltage driving is used, the PWM conversion part (a drive signal generation part, drive signal generation means) 45 generates the aforementioned gate drive signals Duu* to Dwl* used to control the conducting states of the switches corresponding to the three-phase upper and lower arms in the inverter 30. The PWM wave voltage driving is a method in which the voltage command values vu* to vw* of the respective phases are compared with a carrier signal (hereinafter, referred to as "carrier") to calculate PWM control duty command values, and then equivalent sine wave AC voltages are applied to the motor 10 to control the motor 10. To be specific, the PWM conversion part 45 generates the gate drive signals Duu* to Dwl* for the switches on the basis of comparison results between the voltage command values vu* to vw* of the respective phases and a carrier (in this embodiment, triangle wave) corresponding to a carrier frequency fc, and controls the conducting states of the switches by these gate drive signals Duu* to Dwl*. In this embodiment, the carrier frequency fc of the carrier used in the PWM conversion part 45 can be switched in accordance with the carrier frequency command value Sfc from the carrier frequency command part 46.

The carrier frequency command part (carrier frequency command means) 46 outputs the carrier frequency command value Sfc to the current control part 43 and the PWM conversion part 45. In this embodiment, with the carrier frequency command value Sfc, the carrier frequency command part 46 instructs which of 5 kHz and 1.25 kHz to use as the carrier frequency fc.

Figure 2:
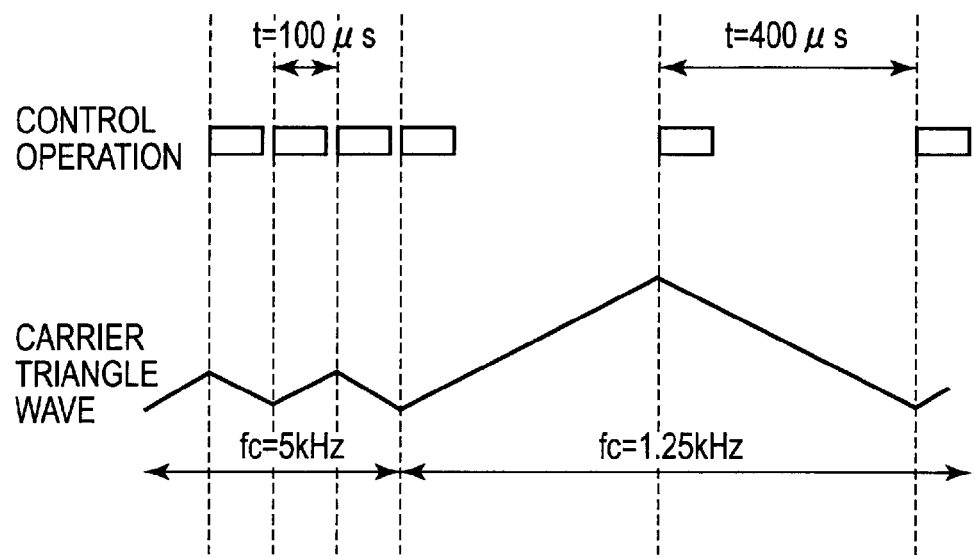
FIG. 2 is an explanatory diagram for describing a control operation cycle in a controller 40 according to the first embodiment.

The controller 40 having such a configuration performs its control operation in a cycle based on the carrier frequency fc of the carrier in the PWM conversion part 45, as shown in FIG. 2. Specifically, the controller 40 performs the control operation through interruption at timings corresponding to the peaks and troughs of the carrier. Thus, in the controller 40, a control operation frequency t is 100 micro seconds when the carrier frequency fc is 5 kHz, and the control operation t is 400 micro seconds when the carrier frequency fc is 1.25 kHz.

Figure 3:
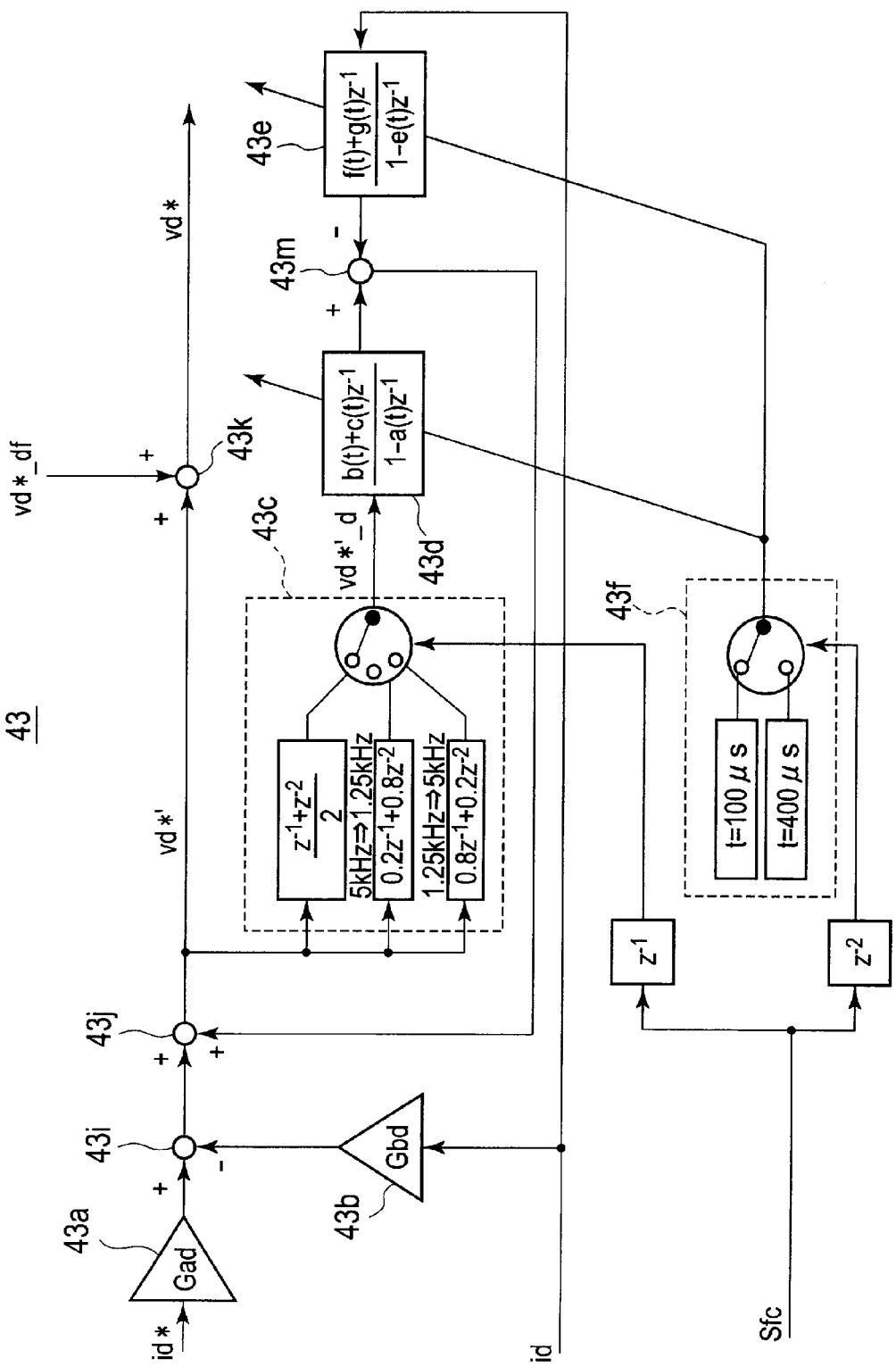
FIG. 3 is an explanatory diagram schematically showing the d-axis configuration of a current control part 43.

Hereinbelow, details of the current control part 43, which is one of the characteristic features of this embodiment, are described. In the following, the description is provided for the configuration of the current control part 43 but only for a configuration related to d-axis current control. A configuration related to q-axis current control is equivalent to that on the d-axis configuration, and thus description of the q-axis configuration is omitted. Here, FIG. 3 is an explanatory diagram schematically showing the d-axis configuration of the current control part 43.

The current control part 43 is mainly formed of a feedback control part (feedback control means) including multipliers 43a and 43b and a subtractor 43i, and a disturbance estimation part (disturbance estimation means). The feedback control part calculates a primary voltage command value through feedback control using the current detection value id. On the other hand, the disturbance estimation part estimates a disturbance component on the basis of the current detection value id and a voltage command value vd*' that is calculated in the last process routine. The disturbance estimation part then adds the estimated disturbance component to the primary voltage command value to obtain a voltage command value vd*'.

The d-axis current command value id* inputted to the current control part 43 is multiplied by a first proportional gain Gad in the multiplier 43a, while the d-axis current detection value id inputted to the current control part 43 is multiplied by a second proportional gain Gbd in the multiplier 43b. Here, the first and second proportional gains Gad and Gbd can be expressed by Math. 3.

$$G_{ad} = \frac{L_d}{tau_m} \quad [\text{Math.3}]$$

$$G_{bd} = \frac{L_d - tau_m R}{tau_m}$$

Here, Ld denotes a d-axis inductance, $tau_m$ denotes a current target response time constant, and R is the resistance of the motor winding. The first and second proportional gains Gad and Gbd described in the above formula are proportional gains for feedback control so set that, in an ideal condition with no parameter errors nor disturbances, the d-axis current detection value id shows a response in conformity with the d-axis current command value id* even without the disturbance estimation part.

The d-axis current command value id* multiplied by the first proportional gain Gad and the d-axis current detection value id multiplied by the second proportional gain Gbd are inputted to the subtractor 43i, where a deviation of one from the other is calculated (Gad×id*−Gbd×id (primary voltage command value)).

The deviation thus calculated in the subtractor 43i is inputted to a subsequent adder 43j, where a later-described estimation value of a disturbance component is added. The result is then outputted as the d-axis voltage command values vd*. As described above, the current control part 43 calculates the d-axis voltage command value vd*' through the feedback control that is based on the d-axis current command value id* and the d-axis current detection value id and involves the adding of the estimated disturbance value. Note that in this embodiment, the d-axis voltage command value vd*' is inputted to a subsequent adder 43k, where the aforementioned d-axis interference voltage command value vd*_df is added. The result is outputted as a final d-axis voltage command value vd*.

The disturbance estimation part is formed of a dead time processor 43c, a low pass filter processor 43d, a voltage command value estimator 43e, and a control operation cycle switcher 43f. By estimating a disturbance component contained in the actual plant, the disturbance estimation part calculates an estimated disturbance value which is an estimation value of the disturbance component.

In the disturbance component estimation operation, the dead time processor 43c performs a dead time process on the d-axis voltage command value vd* in order to set a dead time from the d-axis voltage command value vd* to the d-axis current detection value id. Normally, one and a half control operation cycles should be considered. Then, the dead time processor 43c calculates, as the output of the dead time process (dead time process value vd*'_d), an average value of the last and second last values of the d-axis voltage command value vd*', namely, vd*'(k−1) and vd*'(k−2) (see Math. 4).

$$vd*'\_d = \frac{vd*'(k-2) + vd*'(k-1)}{2}$$ [Math.4]

Here, the last value vd*'(k−1) is a value calculated in the control operation performed one cycle before the current control operation, and the second last value vd*'(k−2) is a value calculated in the control operation performed two cycle before the current control operation.

Figure 4:
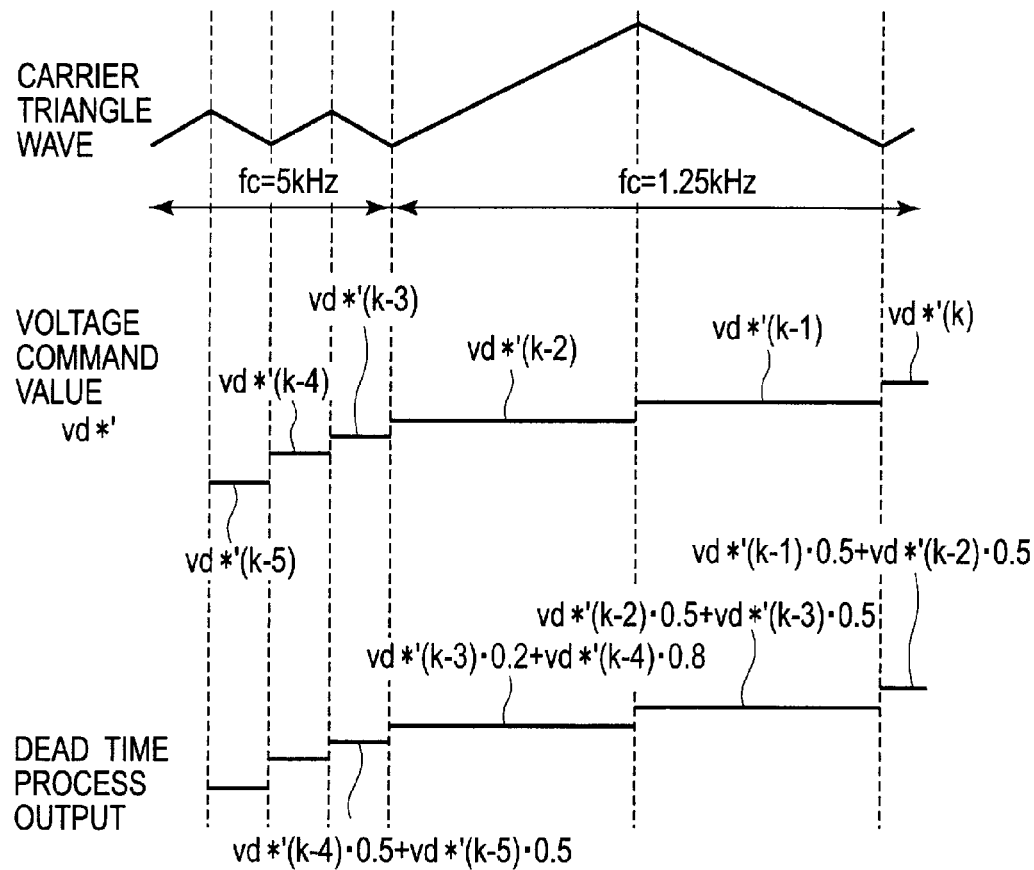
FIG. 4 is an explanatory diagram showing changes in dead time process value.

Note that the dead time processor 43c outputs the dead time process value vd*'_d in a way as described below if it is judged from the carrier frequency command value Sfc that the carrier frequency fc is switched. To be specific, in the control operation immediately after the carrier frequency fc is switched, the dead time processor 43c calculates an intermediate value of the last value vd*'(k−1) and the second last value vd*'(k−2) of the d-axis voltage command value vd*' as the dead time process value vd*'_d, as shown in FIG. 4. To be more specific, the intermediate value is calculated in accordance with the ratio between the carrier frequency fc before the switching and that after the switching. Here, FIG. 4 and Math. 5 show the dead time process value vd*'_d in the case where the carrier frequency fc is switched from 5 kHz to 1.25 kHz, whereas Math. 6 shows the dead time process value vd*'_d in the case where the carrier frequency fc is switched from 1.25 kHz to 5 kHz.

$$vd*'\_d=0.8vd*'(k-2)+0.2vd*'(k-1)$$ [Math.5]

$$vd*'\_d=0.2vd*'(k-2)+0.8vd*'(k-1)$$ [Math.6]

To change control constants dependent on the control operation cycle t in accordance with the switching of the carrier frequency fc, the control operation cycle switcher 43f selects the control operation cycle t on the basis of the carrier frequency command value Sfc. The control constants are control constants that are used for the disturbance estimation and are set for the low pass filter processor 43d and voltage command value estimator 43e to be described later. The control operation cycle t selected in the control operation cycle switcher 43f is reflected in the time constants in each of the low pass filter processor 43d and the voltage command value estimator 43e. It is to be noted that the control operation cycle t selected by the control operation cycle switcher 43f is mainly used to be reflected in the time constants, and the actual control operation cycle t is switched in a corresponding manner to the switching of the carrier frequency fc.

Figure 5:
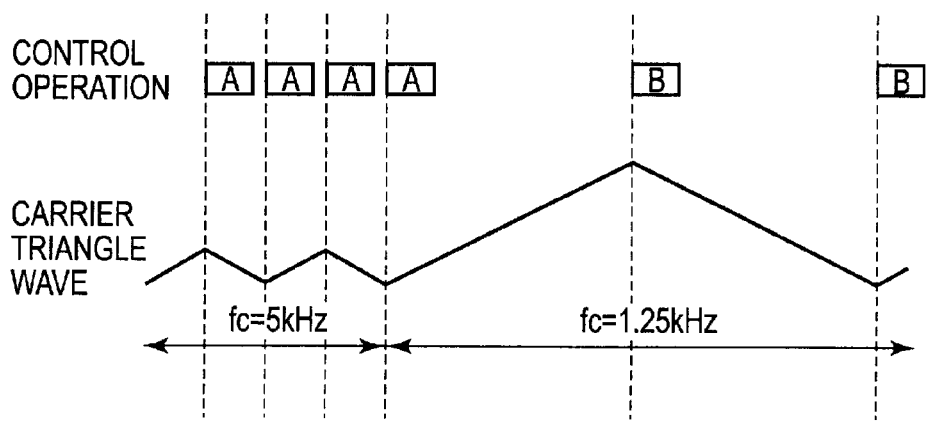
FIG. 5 is an explanatory diagram of control operation cycles to be reflected in control constants.

As one of the characteristic features of this embodiment, the control operation cycle switcher 43f, upon the switching of the carrier frequency fc, reflects the changed control operation cycle t in the control constants in the control operation performed one cycle after the control operation immediately after the carrier frequency fc is switched, i.e., with a delay of one control operation cycle after the switching of the carrier frequency fc. Here, in FIG. 5, each control operation corresponding to "A" represents an operation performed based on control constants dependent on a control operation cycle t of 100 micro seconds, whereas each control operation corresponding to "B" represents an operation performed based on control constants dependent on a control operation cycle t of 400 micro seconds.

The low pass filter processor 43d applies a low pass filter process to the dead time process value vd*'_d to perform disturbance detection. Here, the control constants (the control constants dependent on the control operation cycle t) set for the low pass filter processor 43d can be described in Math. 7.

$$a(t) = \frac{2tau_h - t}{2tau_h + t}$$ [Math.7]

$$b(t) = \frac{t}{2tau_h + t}$$

$$c(t) = \frac{t}{2tau_h + t}$$

Here, $tau_h$ denotes a time constant of the low pass filter, and t denotes a control operation cycle selected by the control operation cycle switcher 43f. For the control constants, the calculations described in Math. 7 may be performed every time the control operation cycle t is changed, or pre-calculated values stored in a memory may be directly selected by the control operation cycle switcher 43f.

The voltage command value estimator 43e applies a filtering process which is similar to that of the low pass filter processor 43d to the d-axis current detection value id. Thus, the voltage command value estimator 43e estimates the voltage command value vd*' from the d-axis current detection value id by an inverse model of the plant. Here, the control constants (the control constants dependent on the control operation cycle t) set for the voltage command value estimator 43e can be described in Math. 8.

$$e(t) = \frac{2tau_h - t}{2tau_h + t}$$ [Math.8]

$$f(t) = \frac{2L_d + Rt}{2tau_h + t}$$

$$g(t) = \frac{-2L_d + Rt}{2tau_h + t}$$

For the control constants, the calculations described in Math. 8 may be performed every time the control operation cycle t is changed, or pre-calculated values stored in a memory may be directly selected by the control operation cycle switcher 43f.

In a subtractor 43m, the output value from the voltage command value estimator 43e is subtracted from the output value from the low pass filter processor 43d, and an estimated disturbance value which is the value obtained by the subtraction is inputted to the adder 43j as mentioned previously and then outputted therefrom as the d-axis voltage command value vd*'.

Figure 6:
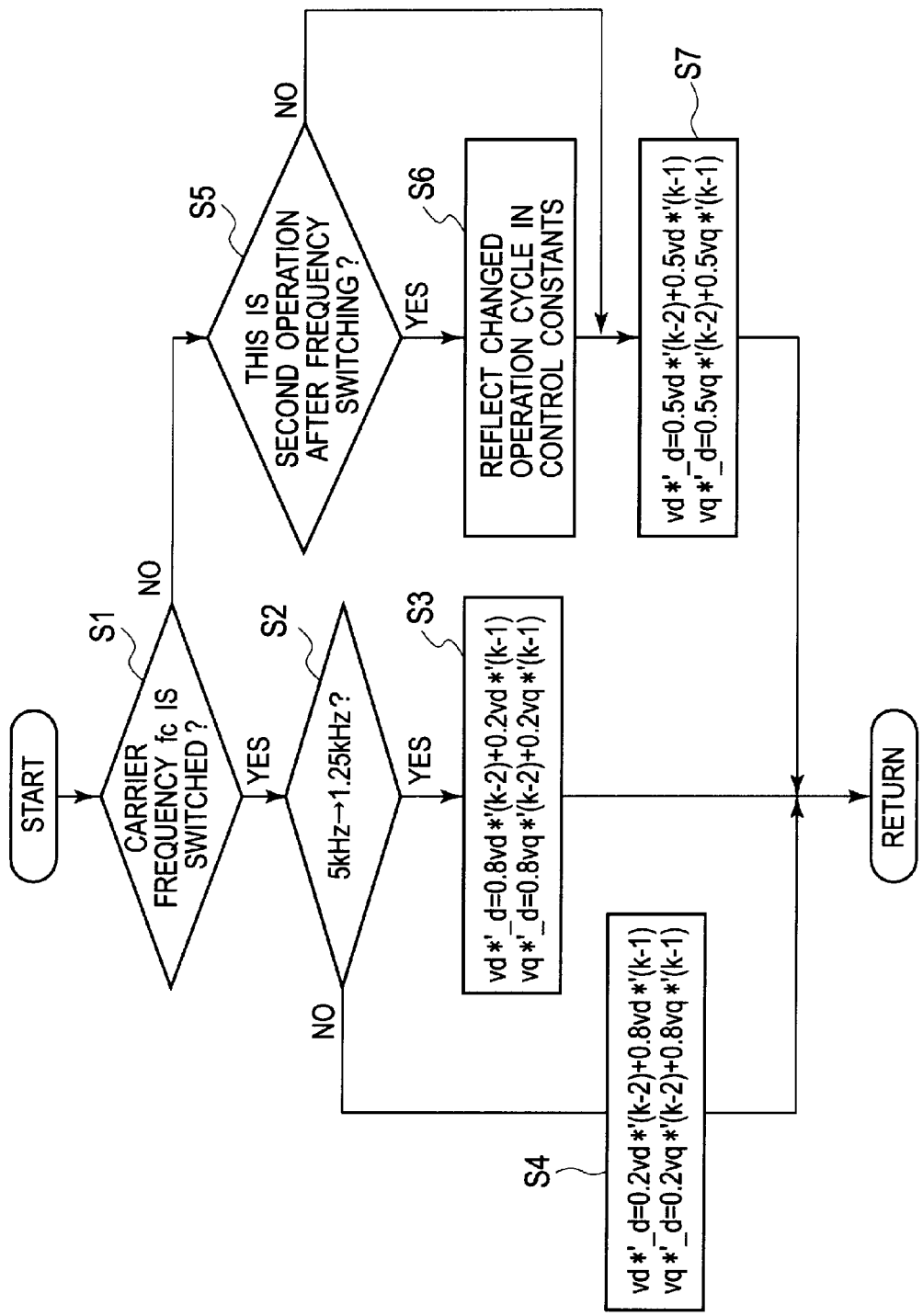
FIG. 6 is a flowchart showing a principle part of a procedure in current control performed by the current control part 43.

The configuration of the current control part 43 has been described above by focusing on the d-axis side configuration. In the following, description is provided for a principle part of a current control operation of the current control part 43 covering both the d-axis side and the q-axis side (estimation of disturbance component). Here, FIG. 6 is a flowchart showing the principle part of a procedure in the current control performed by the current control part 43.

First, in step 1 (S1), the dead time processor 43c judges whether or not the carrier frequency fc is switched, on the basis of the carrier frequency command value Sfc. If an affirmative judgment is made in step 1, i.e., if the carrier frequency fc is switched, the control proceeds to step 2 (S2). On the other hand, if a negative judgment is made in step 1, i.e., if the carrier frequency fc is not switched, the control proceeds to step 5 (S5).

In step 2 (S2), the dead time processor 43c judges whether or not the carrier frequency fc is switched from 5 kHz to 1.25 kHz. If an affirmative judgment is made in step 2, i.e., if the carrier frequency fc is switched from 5 kHz to 1.25 kHz, the control proceeds to step 3 (S3). On the other hand, if a negative judgment is made in step 2, i.e., if the carrier frequency fc is switched from 1.25 kHz to 5 kHz, the control proceeds to step 4 (S4).

In step 3, the dead time processor 43c calculates the dead time process values vd*'_d and vq*'_d for the d axis and q axis, i.e., calculates intermediate values of the last values vd*'(k−1) and vq*'(k−1) and the second last values vd*'(k−2) and vq*'(k−2) of the voltage command values vd*' and vq*' in accordance with the ratio between the carrier frequency fc before the switching and that after the switching (Math. 9).

$$vd*'\_d = 0.8 \cdot vd*'(k-2) + 0.2 \cdot vd*'(k-1)$$

$$vq*'\_d = 0.8 \cdot vq*'(k-2) + 0.2 \cdot vq*'(k-1) \quad [\text{Math.9}]$$

In step 4, the dead time processor 43c calculates the dead time process values vd*'_d and vq*'_d for the d axis and q axis, i.e., calculates intermediate values of the last values vd*'(k−1) and vq*'(k−1) and the second last values vd*'(k−2) and vq*'(k−2) of the voltage command values vd*' and vq*' in accordance with the ratio between the carrier frequency fc before the switching and that after the switching (Math. 10).

$$vd*'\_d = 0.2 \cdot vd*'(k-2) + 0.8 \cdot vd*'(k-1)$$

$$vq*'\_d = 0.2 \cdot vq*'(k-2) + 0.8 \cdot vq*'(k-1) \quad [\text{Math.10}]$$

On the other hand, in step 5, the control operation cycle switcher 43f judges whether or not the process routine is the second one after the carrier frequency fc is switched, i.e., whether or not the current control operation is one cycle after the control operation immediately after the carrier frequency fc is switched. If an affirmative judgment is made in step 5, i.e., if the process routine is the second one after the carrier frequency fc is switched, the control proceeds to step 6 (S6). On the other hand, if a negative judgment is made in step 5, i.e., if the process routine is not the second one after the carrier frequency fc is switched, the control skips a process in step 6 and proceeds to a process in step 7 (S7).

In step 6, the control operation cycle switcher 43f selects the control operation cycle t corresponding to the switched carrier frequency fc (current control operation cycle t) and reflects the changed control operation cycle t in the control constants of the low pass filter processor 43d and the voltage command value estimator 43e.

In step 7, the dead time processor 43c calculates, as the dead time process values vd*'_d and vq*'_d for the d axis and q axis, average values of the last values vd*'(k−1) and vq*' (k−1) and the second last values vd*'(k−2) and vq*'(k−2) of the voltage command values vd*' and vq*' (Math. 11).

$$vd*'\_d = \frac{vd*'(k-2) + vd*'(k-1)}{2} \quad [\text{Math.11}]$$

$$vq*'\_d = \frac{vq*'(k-2) + vq*'(k-1)}{2}$$

As described, in this embodiment, the controller 40 performs the control operation in a cycle based on the carrier frequency fc of the carrier, specifically, at timings corresponding to the peaks and troughs of the carrier. Moreover, in the case where the carrier frequency fc is switched, the disturbance estimation part updates the control constants that are used for the disturbance estimation and are dependent on the control operation cycle t, in the control operation performed in a cycle subsequent to the control operation immediately after the switching of the carrier frequency fc. This avoids such a situation that the control constants dependent on the control operation cycle t are changed at the same time as the switching of the carrier frequency fc, and thereby prevents misestimation of disturbance component. As a result, it is possible to suppress deterioration in current response and thus to reduce a strange feeling the user (driver/passenger) experiences.

Figure 7:
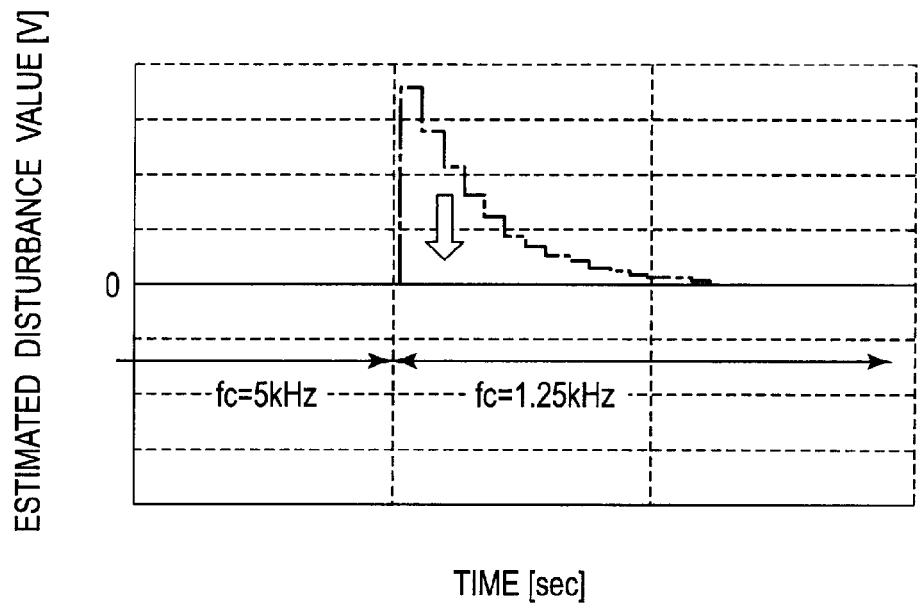
FIG. 7 is an explanatory diagram showing changes in estimated disturbance value before and after a carrier frequency fc is switched.

FIG. 7 is an explanatory diagram showing changes in estimated disturbance value before and after the carrier frequency fc is switched. The diagram shows estimated disturbance values under the assumption that the d-axis current detection value id varies with a constant gradient in a state of no disturbance. The solid line represents an estimated disturbance value in the case where the control constants are updated in the control operation performed one cycle after the control operation immediately after the carrier frequency fc is switched, whereas the dashed line represents an estimated disturbance value in the case where the above-described control procedure is not applied.

In this embodiment, the disturbance estimation part updates the control constants in the control operation performed one cycle after the control operation immediately after the carrier frequency fc is switched in particular. As can be seen from the diagram, a large degree of misestimation of disturbance component can be prevented, and also the control operation can be performed with appropriate control constants. Accordingly, it is possible to avoid such a situation as unwanted deterioration in the current response characteristics.

In addition, the disturbance estimation part performs the dead time process for setting the dead times from the voltage command values vd*' and vq*' to the current detection values id and iq (calculation of the dead time process values vd*'_d and vq*'_d). In this case, in the control operation immediately after the carrier frequency is switched, the disturbance estimation part calculates, as the dead time process values vd*'_d and vq*'_d, intermediate values of the last values vd*'(k−1) and vq*'(k−1) and the second last values vd*'(k−2) and vq*' (k−2) of the voltage command values vd*' and vq*' in accordance with the ratio between the carrier frequency fc before the switching and that after the switching.

Figure 8:
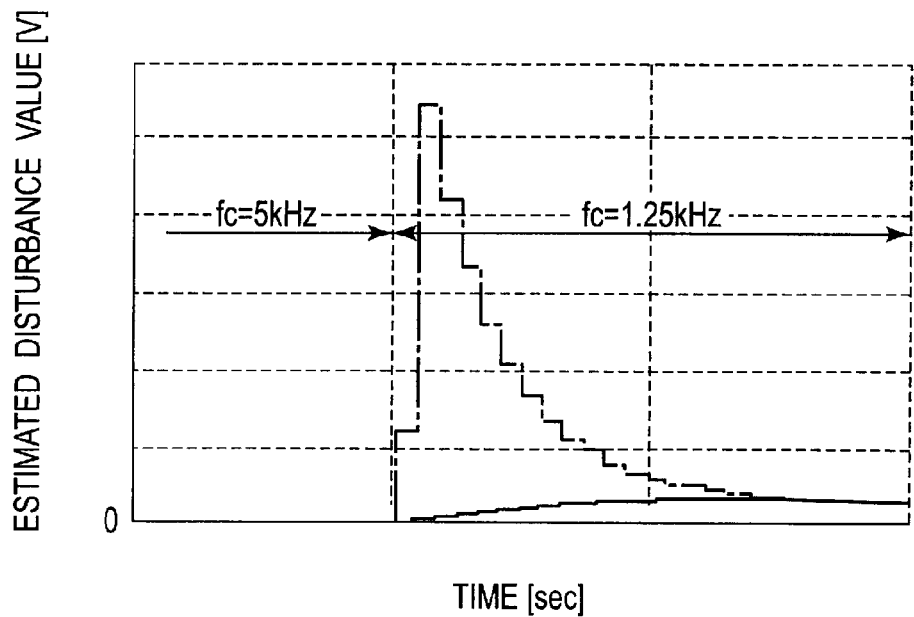
FIG. 8 is an explanatory diagram showing changes in estimated disturbance value before and after the carrier frequency fc is switched.

FIG. 8 is an explanatory diagram showing changes in estimated disturbance value before and after the carrier frequency fc is switched. The diagram shows estimated disturbance values under the assumption that the d-axis current detection value id varies with a constant gradient in a state of no disturbance. The solid line represents an estimated disturbance value in the case where the control constants are updated in the control operation performed one cycle after the control operation immediately after the carrier frequency fc is switched and also where intermediate values of the last value vd*'(k−1) and the second last value vd*'(k−2) of the voltage command value vd*' are calculated in accordance with the ratio between the carrier frequency fc before the switching and that after the switching. On the other hand, the dashed line represents an estimated disturbance value in the case of performing only the updating of the control constants in the control operation performed one cycle after the control operation immediately after the carrier frequency fc is switched. With the procedure of this embodiment represented by the solid line in the diagram, misestimation of disturbance component involved in the switching of the carrier frequency fc can be prevented.

Second Embodiment

Figure 9:
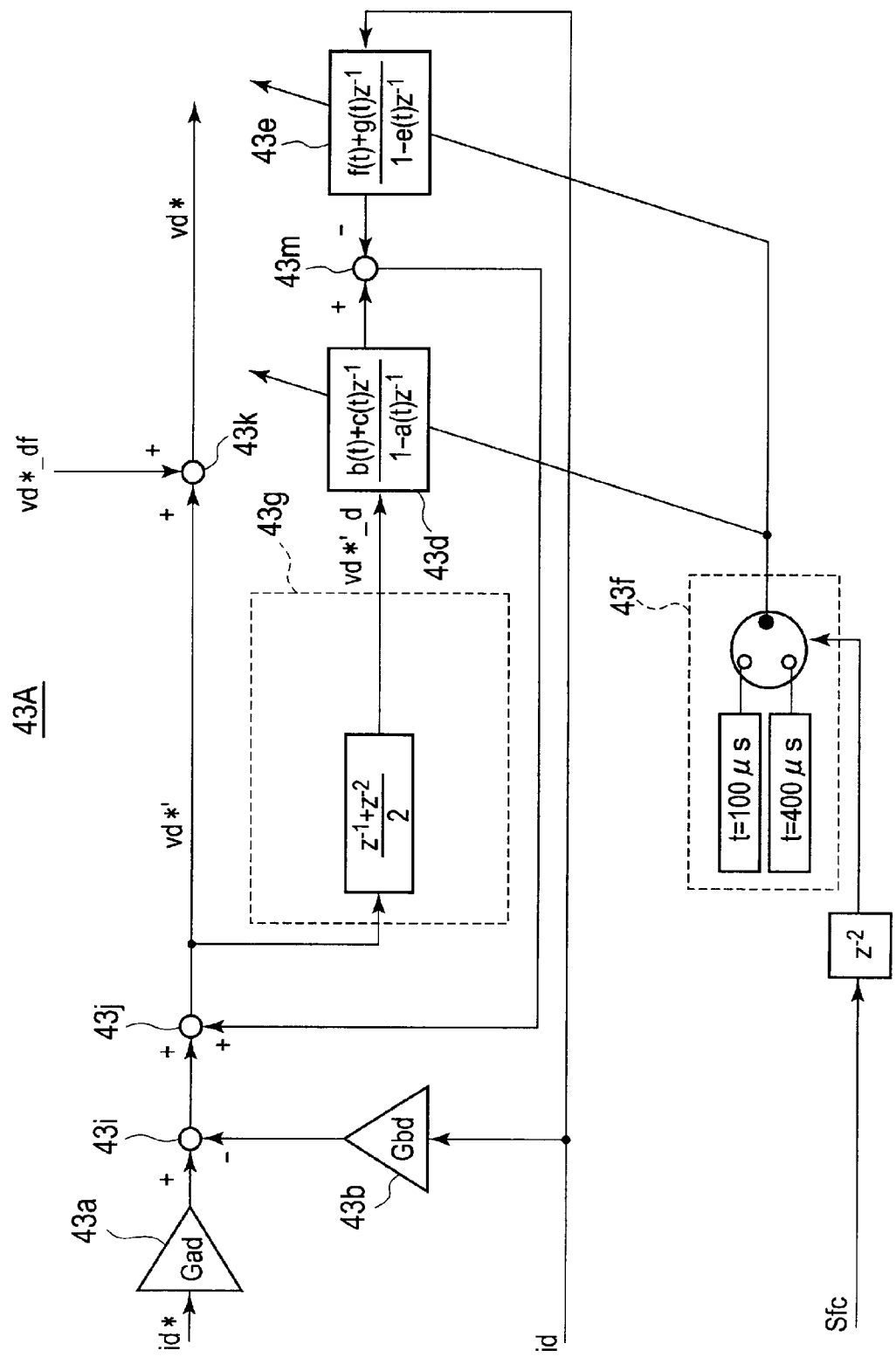
FIG. 9 is an explanatory diagram schematically showing the configuration of a current control part 43A according to a second embodiment.

Hereinbelow, an electric motor control system according to a second embodiment is described. The electric motor control system according to the second embodiment differs from that of the first embodiment in that it includes a current control part 43A instead of the current control part 43. Here, FIG. 9 is an explanatory diagram schematically showing the configuration of the current control part 43A according to the second embodiment. Meanwhile, for components that are common to those in the first embodiment, refer to the previous drawings and reference numerals, and description thereof is omitted. In the following, the difference is mainly described. Moreover, in this embodiment, the description is provided for the configuration of the current control part 43A but only for a configuration related to d-axis current control. A configuration related to q-axis current control is equivalent to the d-axis configuration, and thus description of the q-axis configuration is omitted.

The current control part 43A is mainly formed of the feedback control part including the multipliers 43a and 43b and the subtractor 43i, and the disturbance estimation part. The disturbance estimation part according to this embodiment includes a dead time processor 43g that has a configuration different from that of the first embodiment.

From the viewpoint of simplifying the configuration, this dead time processor 43g outputs a median value of the last and the second last values of the d-axis voltage command value vd*' as the dead time process value vd*'_d (see Math. 4 mentioned above).

Figure 10:
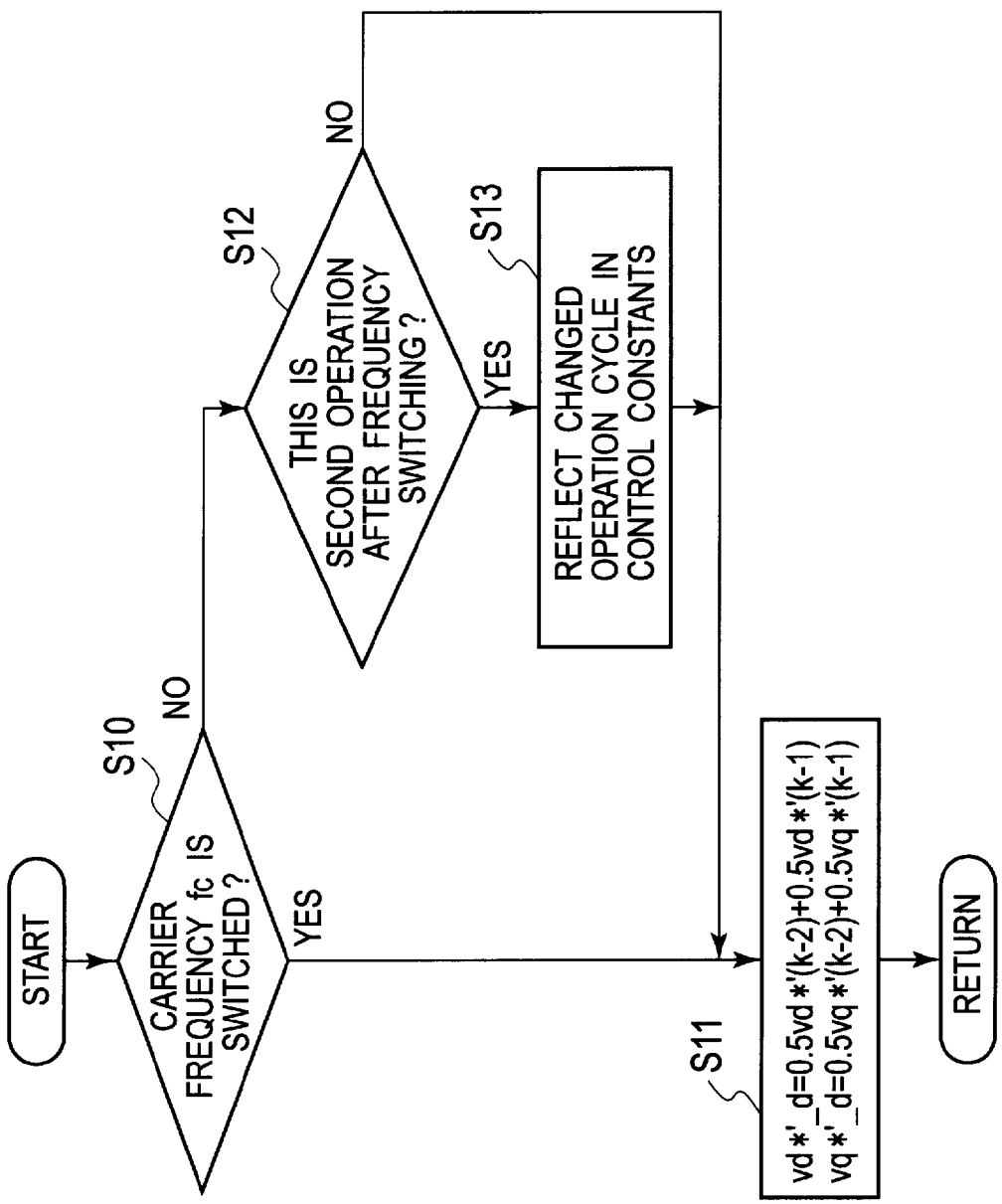
FIG. 10 is a flowchart showing a principle part of a procedure in current control performed by the current control part 43A.

In the following, description is provided for a principle part of a current control operation of the current control part 43A covering both the d-axis side and the q-axis side (estimation of disturbance component). Here, FIG. 10 is a flowchart showing the principle part of a procedure in the current control performed by the current control part 43A.

First, in step 10 (S10), the dead time processor 43g judges whether or not the carrier frequency fc is switched, on the basis of the carrier frequency command value Sfc. If an affirmative judgment is made in step 10, i.e., if the carrier frequency fc is switched, the control proceeds to step 11 (S11). On the other hand, if a negative judgment is made in step 10, i.e., if the carrier frequency fc is not switched, the control proceeds to step 5 (S5).

In step 11, the dead time processor 43g outputs, as the dead time process values vd*'_d and vq*'_d for the d axis and q axis, median values of the last values vd*'(k−1) and vq*'(k−1) and the second last values vd*'(k−2) and vq*'(k−2) of the voltage command values vd*' and vq*' (see Math. 11 mentioned above).

On the other hand, in step 12 (S12), the control operation cycle switcher 43f judges whether or not the process routine is the second one after the carrier frequency fc is switched. If an affirmative judgment is made in step 12, i.e., if the process routine is the second one after the carrier frequency fc is switched, the control proceeds to step 13 (S13). On the other hand, if a negative judgment is made in step 12, i.e., if the process routine is not the second one after the carrier frequency fc is switched, the control skips a process in step 13 and proceeds to a process in step 11.

In step 13, the control operation cycle switcher 43f selects the control operation cycle t corresponding to the switched carrier frequency fc and reflects the changed control operation cycle t in the control constants of the low pass filter processor 43d and the voltage command value estimator 43e.

As described, in this embodiment, the disturbance estimation part updates the control constants in the control operation performed one cycle after the control operation immediately after the carrier frequency fc is switched. Moreover, unlike the first embodiment, even when the carrier frequency fc is switched, the disturbance estimation part calculates, as the dead time process values vd*'_d and vq*'_d, the median values of the last values vd*'(k−1) and vq*'(k−1) and the second last values vd*'(k−2) and vq*'(k−2) of the d- and q-axis voltage command values vd*' and vq*'.

With that configuration, the dead process by the disturbance estimation part, specifically, the dead time processor 43c can follow the switching of the carrier frequency fc in a simpler manner. Consequently, the misestimation of disturbance component can be prevented as shown in FIG. 7 mentioned above, and therefore the current response can be improved.

Third Embodiment

Hereinbelow, an electric motor control system according to a third embodiment is described. The electric motor control system according to the third embodiment differs from that of the first embodiment in that the carrier frequency fc used in the PWM conversion part 45 of the controller 40 is switched between 10 kHz and 1.25 kHz. Meanwhile, for components that are common to those in the first embodiment, refer to the previous drawings and reference numerals, and description thereof is omitted. In the following, the difference is mainly described.

In this embodiment, with the carrier frequency command value Sfc, the carrier frequency command part 46 instructs which one of 10 kHz and 1.25 kHz to use as the carrier frequency fc. The PWM conversion part 45 can switch the carrier frequency fc between 10 kHz and 1.25 kHz in accordance with the carrier frequency command value Sfc.

Figure 11:
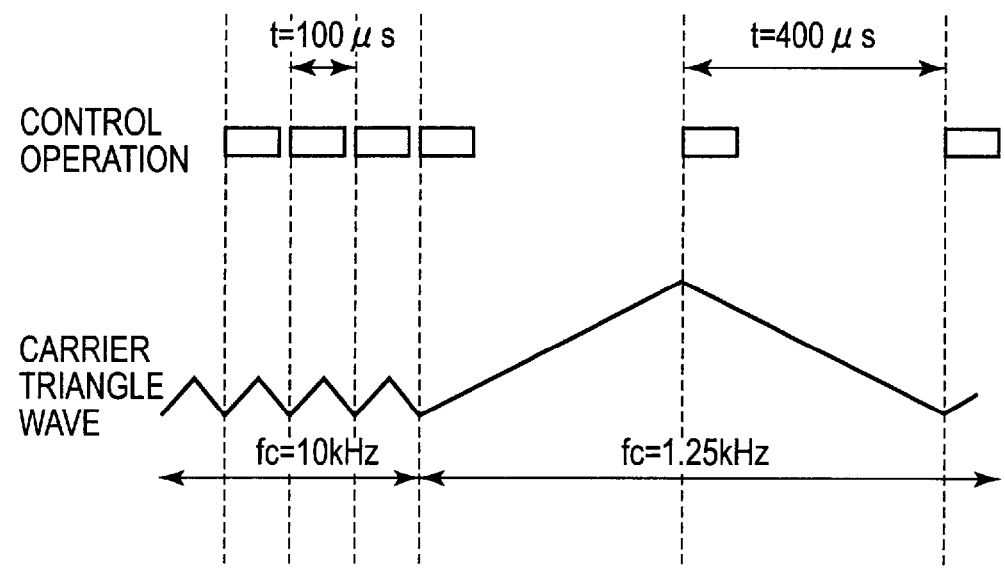
FIG. 11 is an explanatory diagram for describing control operation cycles in the controller 40 according to a third embodiment.

FIG. 11 is an explanatory diagram for describing the control operation cycle t in the controller 40 according to the third embodiment. The controller 40 performs its control operation in a cycle based on the carrier frequency fc of the carrier (triangle wave) in the PWM conversion part 45. Specifically, the controller 40 performs the control operation through interruption at timings corresponding to the troughs of the carrier (triangle wave) while the carrier frequency fc is 10 kHz, and performs the control operation through interruption at timings corresponding to the peaks and troughs of the carrier (triangle wave) while the carrier frequency fc is 1.25 kHz. Accordingly, in the controller 40, the control operation cycle t is 100 micro seconds when the carrier frequency fc is 10 kHz, and the control operation cycle t is 400 micro seconds when the carrier frequency fc is 1.25 kHz.

Figure 12:
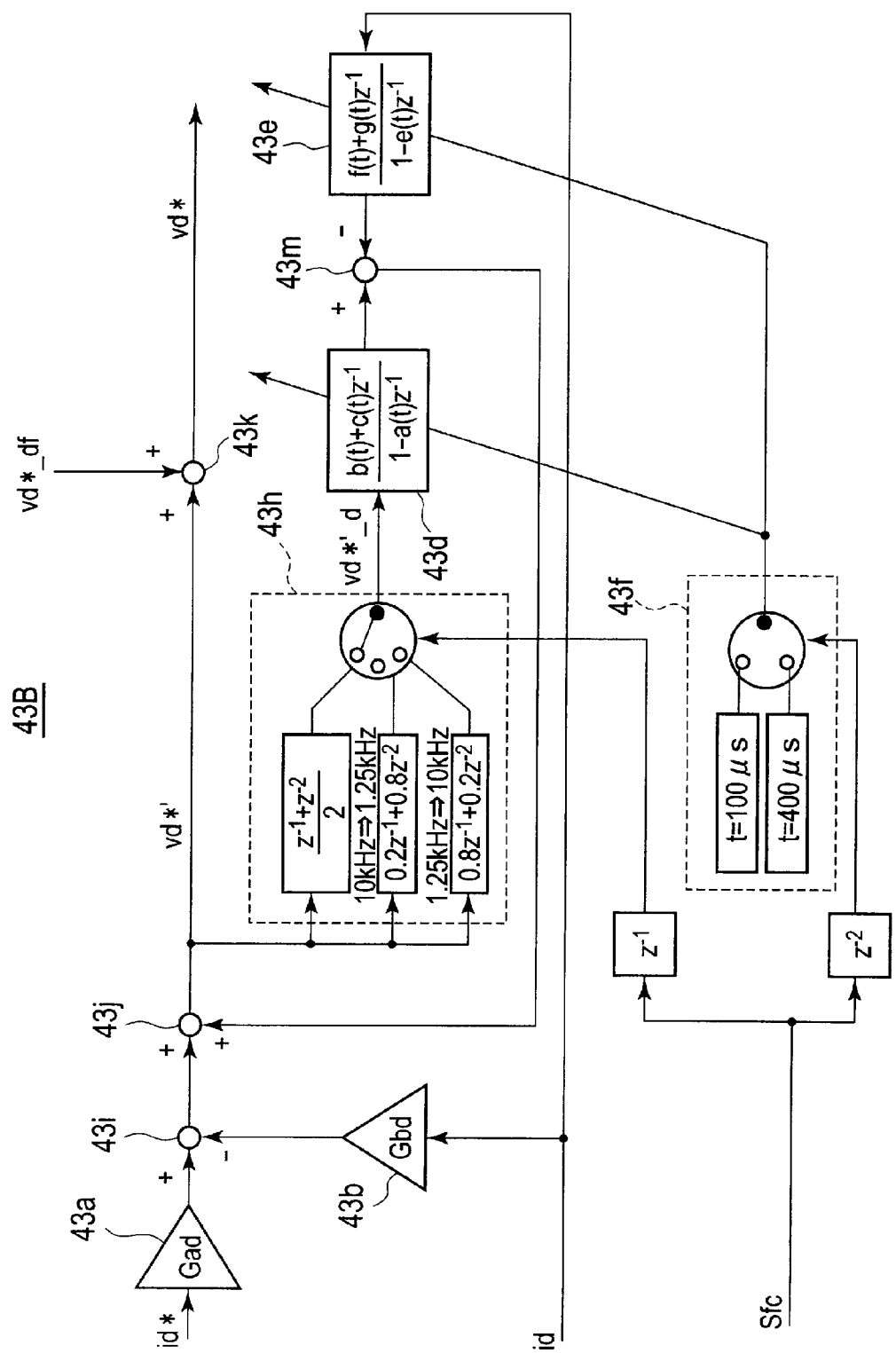
FIG. 12 is an explanatory diagram schematically showing the d-axis configuration of a current control part 43B according to the third embodiment.

Due to such a difference in the carrier frequency fc, a current control part 43B according to the third embodiment includes a dead time processor 43h instead of the dead time processor 43c described in the first embodiment. In the following, description is provided for the configuration of the current control part 43B but only for a configuration related to d-axis current control. A configuration related to q-axis current control is equivalent to the d-axis side configuration, and thus description of the q-axis configuration is omitted. FIG. 12 is an explanatory diagram schematically showing the d-axis configuration of the current control part 43B according to the third embodiment.

In estimating disturbance, the dead time processor 43h performs a dead time process on the d-axis voltage command value vd*' so as to take into account a dead time from the d-axis voltage command value vd*' to the d-axis current detection value id. Normally, one and a half control operation cycles should be considered. Then, the dead time processor 43h outputs, as the dead time process value vd*'_d, an average value of the last and second last values of the d-axis voltage command value vd*' (see Math. 4 mentioned above).

Note that the dead time processor 43h outputs the dead time process value vd*'_d in a way as described below if it is judged from the carrier frequency command value Sfc that the carrier frequency fc is switched. To be specific, in the control operation immediately after the carrier frequency fc is switched, the dead time processor 43c calculates an intermediate value of the last value vd*'(k-1) and the second last value vd*'(k-2) of the d-axis voltage command value vd*' as the dead time process value vd*'_d. To be more specific, the intermediate value is calculated in accordance with the ratio between the control operation cycle t before the switching and that after the switching. Here, Math. 5 mentioned above corresponds to the dead time process value vd*'_d in the case where the carrier frequency fc is switched from 10 kHz to 1.25 kHz, whereas Math. 6 mentioned above corresponds to the dead time process value vd*'_d in the case where the carrier frequency fc is switched from 1.25 kHz to 10 kHz.

Figure 13:
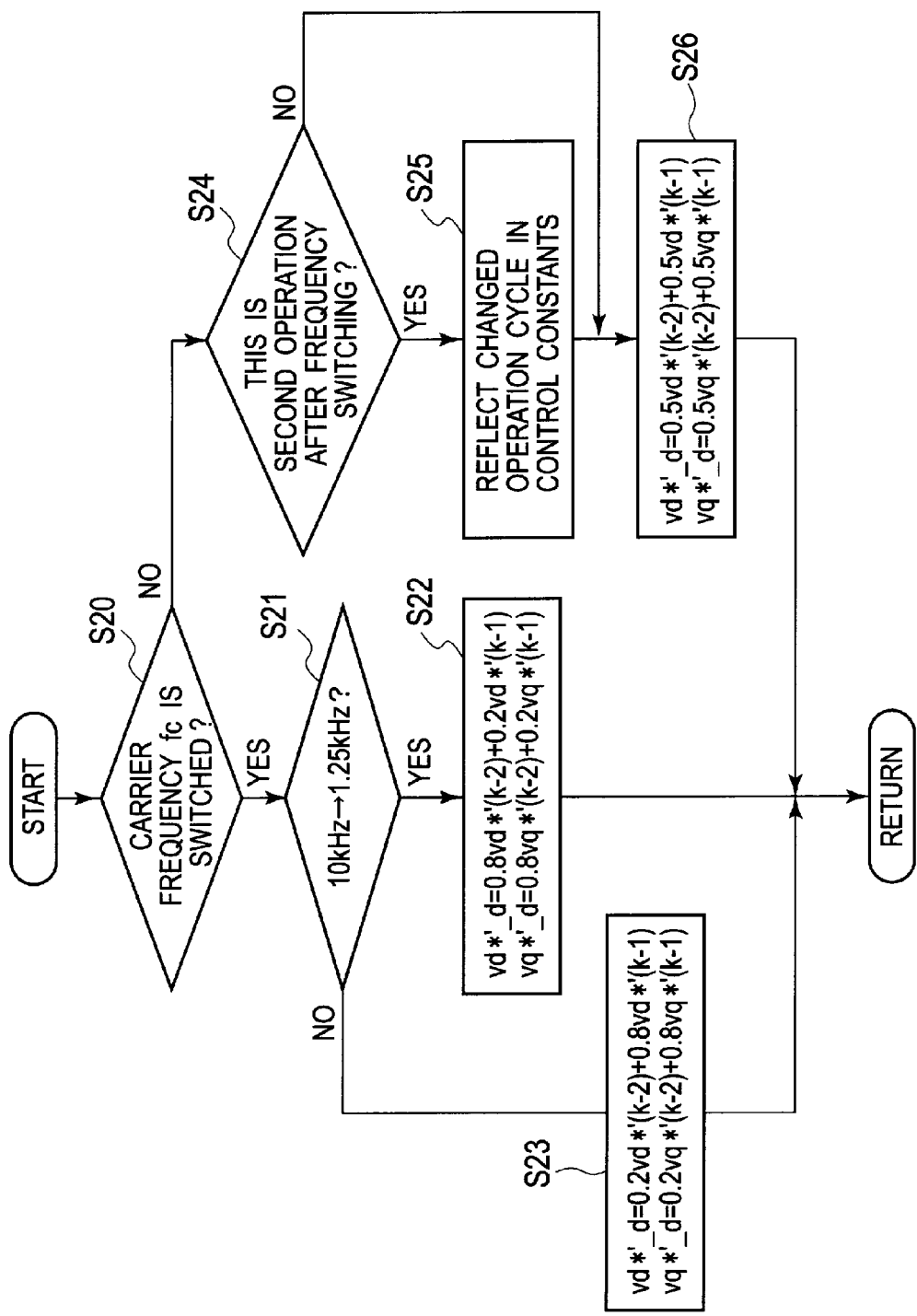
FIG. 13 is a flowchart showing a principle part of a procedure in current control performed by the current control part 43B.

The configuration of the current control part 43B has been described above by focusing on the d-axis configuration. In the following, description is provided for a principle part of a current control operation of the current control part 43B covering both the d-axis side and the q-axis side. Here, FIG. 13 is a flowchart showing the principle part of a procedure in the current control performed by the current control part 43B.

First, in step 20 (S20), the dead time processor 43h judges whether or not the carrier frequency fc is switched, on the basis of the carrier frequency command value Sfc. If an affirmative judgment is made in step 20, i.e., if the carrier frequency fc is switched, the control proceeds to step 21 (S21). On the other hand, if a negative judgment is made in step 20, i.e., if the carrier frequency fc is not switched, the control proceeds to step 24 (S24).

In step 21 (S21), the dead time processor 43h judges whether or not the carrier frequency fc is switched from 10 kHz to 1.25 kHz. If an affirmative judgment is made in step 21, i.e., if the carrier frequency fc is switched from 10 kHz to 1.25 kHz, the control proceeds to step 22 (S22). On the other hand, if a negative judgment is made in step 21, i.e., if the carrier frequency fc is switched from 1.25 kHz to 10 kHz, the control proceeds to step 23 (S23).

In step 22, the dead time processor 43h outputs, as the dead time process values vd*'_d and vq*'_d for the d axis and q axis, intermediate values of the last values vd*'(k-1) and vq*'(k-1) and the second last values vd*'(k-2) and vq*'(k-2) of the voltage command values vd*' and vq*' in accordance with the ratio between the control operation cycle t before the switching of the carrier frequency fc and that after the switching (see Math. 9 mentioned above).

In step 23, the dead time processor 43h outputs, as the dead time process values vd*'_d and vq*'_d for the d axis and q axis, intermediate values of the last values vd*'(k-1) and vq*'(k-1) and the second last values vd*'(k-2) and vq*'(k-2) of the voltage command values vd*' and vq*' in accordance with the ratio between the control operation cycle t before the switching of the carrier frequency fc and that after the switching (see Math. 10 mentioned above).

On the other hand, processes in step 24 (S24) to step 26 (S26) are executed in the same manner as the processes in step 5 to step 7 described in the first embodiment, respectively.

As described, in this embodiment, the disturbance estimation part calculates the dead time process values vd*'_d and vq*'_d for setting the dead times from the voltage command values vd*' and vq*' to the current detection values id and iq to be feedback. In the control operation immediately after the carrier frequency fc is switched, the disturbance estimation part calculates the dead time process values vd*'_d and vq*'_d, i.e., intermediate values of the last values vd*'(k-1) and vq*'(k-1) and the second last values vd*'(k-2) and vq*'(k-2) of the voltage command values vd*' and vq*' in accordance with the ratio between the control operation cycle t before the switching of the carrier frequency fc and that before the switching.

With this configuration, misestimation of disturbance component involved in the switching of the carrier frequency fc can be prevented even when the interruption of the control operation is changeable by the switching of the carrier frequency fc. Accordingly, it is possible to avoid such a situation as deterioration in the current response characteristics.

Hereinabove, the electric motor controllers and the electric motor control systems according some embodiments of the present invention are described. It is needless to say, however, that the present invention is not limited to the above-described embodiments and that various modifications are possible without departing from the scope of the invention. For example, in some of the above-described embodiments, in the control operation immediately after the carrier frequency is switched, the d- and q-axis dead time process values, i.e., intermediate values of the last and second last values of the d- and q-axis voltage command values are calculated in accordance with the ratio between the carrier frequency or the control operation cycle before the switching and that after the switching. However, by utilizing the techniques shown in the first and third embodiments, the intermediate values of the last and second last values of the d- and q-axis voltage command values may be calculated in accordance with the ratio between the carrier frequency before the switching of the carrier frequency and that after the switching, as well as the ratio between the control operation cycle before the switching and that after the switching. Such an embodiment can also prevent misestimation of disturbance component involved in the switching of the carrier frequency fc even when the interruption of the control operation is changed in response to the switching of the carrier frequency fc. Accordingly, it is possible to avoid such a situation as deterioration in the current response characteristics.

The entire contents of a Japanese Patent Application No. P2010-127385 with a filing date of Jun. 6, 2010 are herein incorporated by reference.

INDUSTRIAL APPLICABILITY

The present invention is characterized in that, in the case where the carrier frequency fc is switched, a disturbance estimation part forming the controller 40 updates control constants that are used for disturbance estimation and are dependent on the control operation cycle, in a control operation performed one cycle after a control operation immediately after the switching of the carrier frequency fc. Therefore, misestimation of disturbance component at the time of switching the carrier frequency is prevented, whereby deterioration in the current response characteristics is suppressed. Therefore, the electric motor controller and the electric motor control system according to the present invention are industrially applicable.

REFERENCE SIGNS LIST

- 10 motor
- 20 power supply
- 30 inverter
- 40 controller (electric motor controller)
- 41 current/voltage calculation part
- 42 low pass filter process part
- 43 current control part
- 43a, 43b multiplier
- 43c dead time processor
- 43d low pass filter processor
- 43e voltage command value estimator
- 43f control operation cycle switcher
- 44 coordinate conversion part
- 45 PWM conversion part
- 46 carrier frequency command part
- 47 coordinate conversion part
- 48 revolution calculation part
- 50 current sensor
- 51 position sensor

The invention claimed is:

1. An electric motor controller to control an electric motor through a power conversion unit configured to convert an inputted power by use of a switching unit and to output the converted power, the electric motor controller comprising:
a current detection unit configured to detect a current supplied to the electric motor as a current detection value; and
a control unit configured to perform a control operation in a cycle based on a carrier frequency of a carrier signal, wherein
the control unit includes
a current control part configured to calculate a voltage command value of a voltage to be applied to the electric motor,
a drive signal generation part configured to generate a drive signal for driving the switching unit by comparing the voltage command value outputted from the current control part with the carrier signal, and
a carrier frequency command part configured to instruct switching of the carrier frequency of the carrier signal,
the current control part includes
a feedback control part configured to calculate the voltage command value through feedback control using the current detection value; and
a disturbance estimation part configured to estimate a disturbance component on the basis of the current detection value and the voltage command value and add the estimated disturbance component to the voltage command value to be outputted to the drive signal generation part, and
in a case where the carrier frequency is switched, the disturbance estimation part updates a control constant that is used for the disturbance estimation and is dependent on a control operation cycle, in a control operation performed in a cycle later than a control operation immediately after the switching of the carrier frequency.

2. The electric motor controller according to claim 1, wherein the disturbance estimation part updates the control constant in a control operation performed one cycle after the control operation immediately after the switching of the carrier frequency.

3. The electric motor controller according to claim 1, wherein the disturbance estimation part calculates a dead time process value for setting a dead time in the feedback from the voltage command value to the current detection value, and calculates an intermediate value of the last and the second last values of the voltage command value as the dead time process value.

4. The electric motor controller according to claim 3, wherein, in the control operation immediately after the switching of the carrier frequency, the disturbance estimation part calculates the intermediate value of the last and the second last values of the voltage command value in accordance with a ratio between the carrier frequency before the switching and that after the switching.

5. The electric motor controller according to claim 3, wherein, in the control operation immediately after the switching of the carrier frequency, the disturbance estimation part calculates the intermediate value of the last and the second last values of the voltage command value in accordance with a ratio between the control operation cycle before the switching of the carrier frequency and that after the switching.

6. The electric motor controller according to claim 3, wherein, in the control operation immediately after the switching of the carrier frequency, the disturbance estimation part calculates the intermediate values of the last and the second last values of the voltage command value in accordance with a ratio between the carrier frequency before the switching of the carrier frequency and that after the switching as well as a ratio between the control operation cycle before the switching and that after the switching.

7. An electric motor control system comprising:
a power conversion unit configured to convert a power inputted from a power supply by use of a switching unit and to output the converted power;
an electric motor configured to output a torque depending on a voltage applied from the power conversion unit; and
a controller configured to control the electric motor through the power conversion unit, wherein
the controller includes
a current detection unit configured to detect a current supplied to the electric motor as a current detection value, and
a control unit configured to perform a control operation in a cycle based on the a carrier frequency of a carrier signal,
the control unit includes
a current control part configured to calculate a voltage command value of a voltage to be applied to the electric motor,
a drive signal generation part configured to generate a drive signal for driving the switching unit by comparing the voltage command value outputted from the current control unit with the carrier signal, and
a carrier frequency command part configured to instruct switching of the carrier frequency of the carrier signal, the current control part includes
- a feedback control part configured to calculate the voltage command value through feedback control using the current detection value; and
- a disturbance estimation part configured to estimate a disturbance component on the basis of the current detection value and the voltage command value and to add the estimated disturbance component to the voltage command value to be outputted to the drive signal generation part, and in a case where the carrier frequency is switched, the disturbance estimation part updates a control constant that is used for the disturbance estimation and is dependent on a control operation cycle, in a control operation performed in a cycle later than a control operation immediately after the switching of the carrier frequency.

8. The electric motor control system according to claim 7, wherein the disturbance estimation part updates the control constant in a control operation performed one cycle after the control operation immediately after the switching of the carrier frequency.

9. The electric motor control system according to claim 7, wherein the disturbance estimation part calculates a dead time process value for setting a dead time in the feedback from the voltage command value to the current detection value, and calculates an intermediate value of the last and the second last values of the voltage command value as the dead time process value.

10. The electric motor control system according to claim 9, wherein, in the control operation immediately after the switching of the carrier frequency, the disturbance estimation part calculates the intermediate value of the last and the second last values of the voltage command value in accordance with a ratio between the carrier frequency before the switching and that after the switching.

11. The electric motor control system according to claim 9, wherein, in the control operation immediately after the switching of the carrier frequency, the disturbance estimation part calculates the intermediate value of the last and the second last values of the voltage command value in accordance with a ratio between the control operation cycle before the switching of the carrier frequency and that after the switching.

12. The electric motor control system according to claim 9, wherein, in the control operation immediately after the switching of the carrier frequency, the disturbance estimation part calculates the intermediate values of the last and the second last values of the voltage command value in accordance with a ratio between the carrier frequency before the switching of the carrier frequency and that after the switching as well as a ratio between the control operation cycle before the switching and that after the switching.

13. An electric motor controller to control an electric motor through power conversion means for converting an inputted power by use of switching means and to output the converted power, the electric motor controller comprising:
- current detection means for detecting a current supplied to the electric motor as a current detection value; and
- control means for performing a control operation in a cycle based on a carrier frequency of a carrier signal, wherein the control means includes
- current control means for calculating a voltage command value of a voltage to be applied to the electric motor,
- drive signal generation means for generating a drive signal for driving the switching means by comparing the voltage command value outputted from the current control means with the carrier signal, and
- carrier frequency command means for instructing switching of the carrier frequency of the carrier signal, the current control means includes
- feedback control means for calculating the voltage command value through feedback control using the current detection value; and
- disturbance estimation means for estimating a disturbance component on the basis of the current detection value and the voltage command value and add the estimated disturbance component to the voltage command value to be outputted to the drive signal generation means, and in a case where the carrier frequency is switched, the disturbance estimation means update a control constant that is used for the disturbance estimation and is dependent on a control operation cycle, in a control operation performed in a cycle later than a control operation immediately after the switching of the carrier frequency.

* * * * *